Nov. 1, 1955 — L. A. RICHARDS — 2,722,658
INSTRUMENT FOR MEASURING ELECTRICAL
CONDUCTIVITY OF TEST SOLUTIONS
Filed Aug. 11, 1954
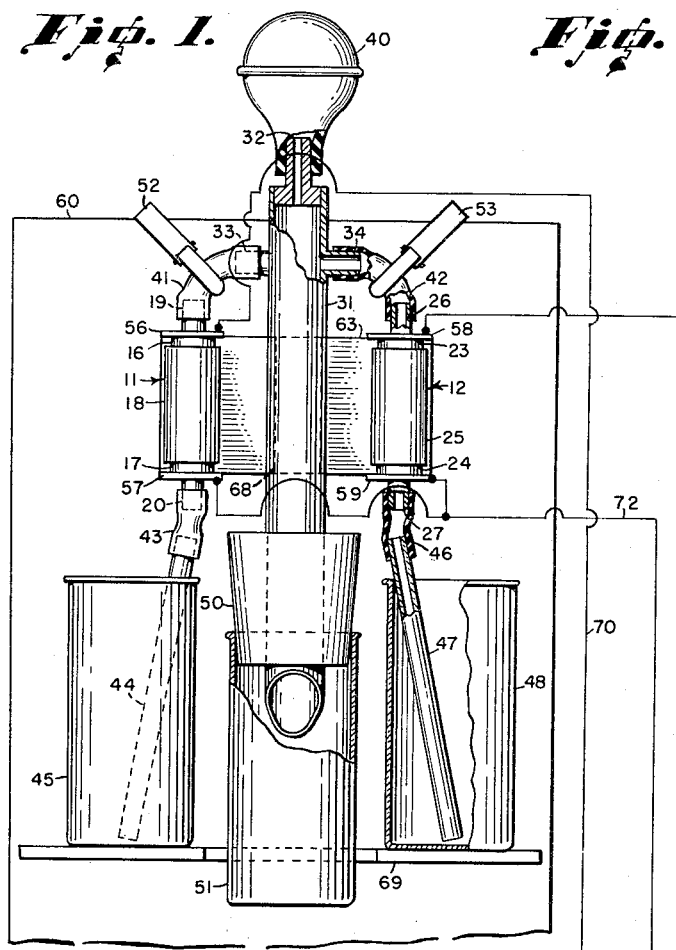
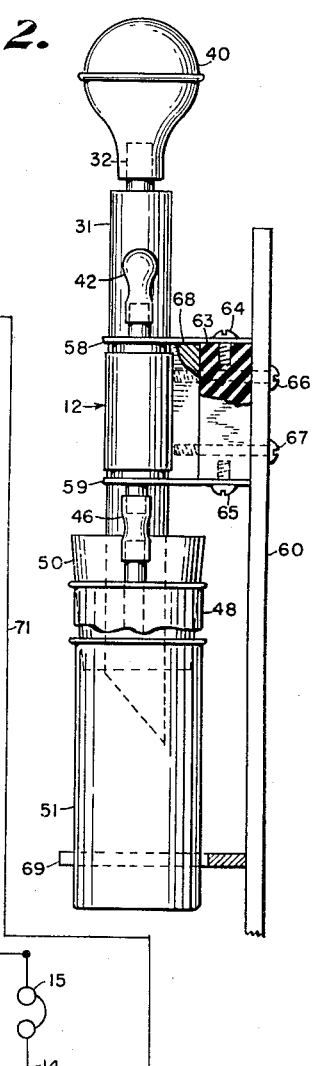
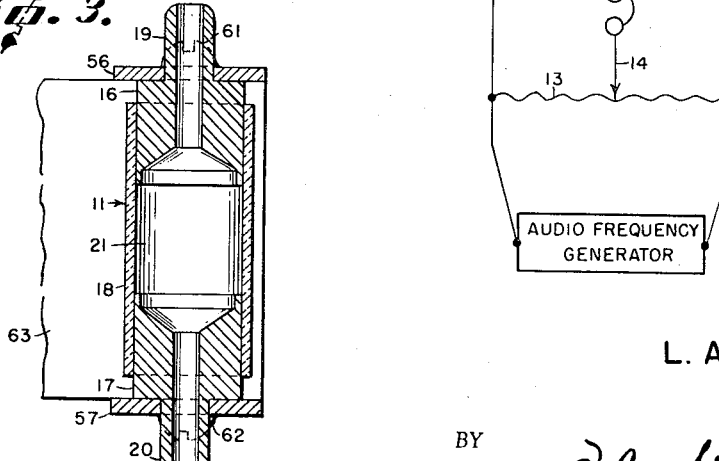
INVENTOR
L. A. RICHARDS

United States Patent Office 2,722,658
Patented Nov. 1, 1955

2,722,658

INSTRUMENT FOR MEASURING ELECTRICAL CONDUCTIVITY OF TEST SOLUTIONS

Lorenzo A. Richards, Riverside, Calif.

Application August 11, 1954, Serial No. 449,283

6 Claims. (Cl. 324—30)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to instruments for measuring the electrical conductivity of test solutions, such as soil solutions and irrigation waters, for analytical purposes, and particularly to instruments provided with cells for containing solutions for testing purposes, means being included for washing, filling and emptying the cells in an expeditious and simple manner.

In general, according to the invention, the instrument is provided with a hermetically-sealed cell having two electrodes and a cell reservoir for containing the test solution. The cell also has an inlet port for introduction of the test solution and an outlet port located at a higher elevation than the inlet port for discharge of the test solution. A second cell, of similar structure as the aforementioned cell, for containing standard solution against which the test solution is to be measured, is also included.

The instrument is further provided with an upwardly-extending drainpipe which is open at both ends and which is connected between its ends with the outlet ports of the cells. This drain pipe serves as a common drain for the overflow test and standard solutions from the cells. A suction pump is connected to the upper end of the drainpipe and serves as the common means for pumping the test and standard solutions through the respective cells. A hermetically-sealed flush reservoir connected to the lower end of the drainpipe receives the overflow test and standard solutions. Valves are also provided for alternatively shutting off the flow of the respective solutions through the cells. Thus, by means of the suction pump and drainpipe, the two cells can be independently washed, filled, and emptied of solution.

Preferably, each cell has an insulating tube open at both ends with an electrode hermetically-sealed to each end thereof, the tube and electrodes forming the cell reservoir. The inlet port extends through one electrode for introduction of solution into the cell reservoir and the outlet port extends through the other electrode for discharge of the solution. It is additionally preferred that the outlet port of each cell taper upwardly thereby facilitating the escape of air bubbles during the filling of the cell reservoir.

In the accompanying drawing

Fig. 1 is a front elevation of the instrument with some parts cut away and some parts shown in circuit diagram;

Fig. 2 is a side elevation of the instrument; and

Fig. 3 is an enlarged longitudinal section of the cell containing the test solution.

Referring with more particularity to the drawing, the instrument is provided with a conductivity cell 11 for holding the test solution and a similar cell 12 for containing a standard solution against which the electrical conductivity of the test solution is to be measured. These two cells constitute two arms of a conventional Wheatstone bridge circuit. The other two arms of the circuit comprise a resistance 13, and a variable slide contact 14, both shown schematically. The contact 14 has a dial attached thereto which is calibrated in electrical conductivity units. The bridge voltage is supplied by an audio frequency generator shown by legend, for example, a buzzer energized by a dry cell, preferably of 1½ volts, and operated when a switch is depressed. An earphone 15 serves as the null indicator.

Cells 11 and 12 are of similar construction and cell 11 only will be described in detail. This cell comprises a metallic upper electrode 16, preferably made of stainless steel, and a similar lower electrode 17, these electrodes being sealingly positioned in a tube 18, made of glass or other insulating material. The free ends of the electrodes 16 and 17 protrude beyond the ends of the tube 18 and terminate in nipples 19 and 20, respectively, forming a cell reservoir 21 between them for containing the test solution. The test solution is introduced into the cell reservoir through the inlet port at the end of nipple 20 and discharged through the outlet port at the end of nipple 19, the outlet port being at a higher elevation than the inlet port. Further, the outlet port, as may be seen from Fig. 3, tapers upwardly thereby facilitating the escape of air bubbles from the cell during the filling of reservoir 21 with test solution. Cell 12 comprises an upper electrode 23, a lower electrode 24, tube 25, nipples 26 and 27, and a cell reservoir for containing the standard solution.

The instrument is also provided with a drainpipe 31, preferably constructed of metal. This drainpipe is open at both ends, the upper end terminating in nipple 32. The drainpipe also has a pair of nipples 33 and 34 between its ends.

A suction pump, illustrated as a suction bulb 40 adapted to sealingly fit over nipple 32, is also provided, and is the common means for pumping solution through the cells. A flexible tube 41 connects nipples 33 and 19 thereby attaching cell 11 to drainpipe 31 while a corresponding flexible tube 42 connects nipples 26 and 34 thereby joining cell 12 to drainpipe 31. As is readily apparent from this structure, the drainpipe acts as a common drain for both cells. A flexible tube 43 serves to connect nipple 20 with the upper end of a suction tube 44, the lower end of said suction tube 44 extending below the surface of test solution in container 45. Correspondingly, a flexible tube 46 connects nipple 27 with the upper end of suction tube 47 while the lower end of this suction tube extends below the surface of the standard solution in container 48. The lower open end of drainpipe 31 extends through rubber stopper 50 into a flush reservoir 51 thus forming a hermetic seal. The drainpipe is of a sufficiently large diameter that liquid will drain downwardly through it into the flush reservoir while the displaced air escapes upwardly into the suction bulb 40. Valve means for alternatively stopping the flow of the test and standard solutions through cells 11 and 12 are provided. These are illustrated as pinchclamps 52 and 53 for pinching off tubes 41 and 42, respectively.

The instrument is also provided with upper and lower electrical terminal brackets 56 and 57 which are integrally fixed, as by soldering, to the protruding surfaces of the electrodes 16 and 17, respectively, on cell 11. Corresponding brackets 58 and 59 are also included for cell 12. Brackets 56 and 57 function to mount the cell 11 on board 60 through the medium of screws 61 and 62 screwed into insulating block 63. Corresponding screws 64 and 65 function similarly to mount cell 12 on the block 63. The block 63 in turn is mounted on the board 60 through screws 66 and 67 which pass through the block 63 and are threaded into metallic block 68 to which drainpipe 31 is soldered to support it and the flush reservoir. A ledge 69 supports containers 45 and 48.

These electrical terminal brackets serve also as terminals for the cells in the electrical circuit, brackets 56 and 58 being connected to resistance 13 through lead wires 70 and 71, respectively, while brackets 57 and 59 are connected through common lead wire 72, through earphone 15, and thence through slide contact 14, to resistance 13.

In operating the instrument, cell 12 is first washed, filled, and emptied several times with the standard solution. This is accomplished by pinching off tube 41 with pinchclamp 52 thereby isolating cell 11. Thereafter, the suction bulb 40 is compressed and the standard solution, contained in container 48, is then drawn up into cell 12 through suction tube 47 by releasing the suction bulb. The solution is allowed to overflow into drainpipe 31 and is received in flush reservoir 51 for discarding. After the cell has been thoroughly washed, it is then filled with the standard solution and the tube 42 is pinched off with pinchclamp 53 thereby retaining the solution in the cell.

The washing, filling, and emptying of cell 11 with the test solution, when a sufficient quantity is available, is carried out in a manner analogous to that described above for the standard solution.

If only a small amount of test solution is available, a more economical washing process can be used. With the suction bulb completely compressed, the cell is filled ⅓ to ½ full of the test solution, the container 45 is lowered so that the lower end of suction tube 44 is above the surface of the solution in the container, and the solution gargled violently in the cell by releasing the suction bulb. The cell is then filled with test solution.

After both cells have been filled and connected to the Wheatstone bridge circuit, the conductivity measurement is made by holding the earphone 15 to the ear while adjusting the slide contact 14 until the null point is attained. The conductivity is then read from the dial which is calibrated in millimhos per cm. at 25° C. between the limits of 0.05 and 64 millimhos per cm. Instrumental errors will not exceed ±10 percent.

The instrument has particular application in agriculture where, for example, it is desired to diagnose the salinity of soil solutions and irrigation waters. Salinity is a common problem in irrigation agriculture since saline conditions often reduce yields of crops. The electrical conductivity of such saline solutions can be readily measured by the instrument and is closely related to the total concentration of the salts commonly encountered. Although such electrical conductivity measurements can be converted to other scales for expressing concentration of dissolved material, for many purposes such conversion is unnecessary, and the agricultural significance can be evaluated directly from the electrical conductivity measurements.

As an example of the use of the instrument for determining the electrical conductivity of irrigation waters, cell 11 is filled with a sample of irrigation water (test solution) and cell 12 is filled with saturated gypsum solution as the standard solution. This gypsum solution is prepared by placing an excess of reagent grade calcium sulfate in a bottle of distilled water and shaking until saturation is obtained. The cells are then connected in the Wheatstone bridge circuit as described hereinbefore and the electrical conductivity of the test solution compared with that of the gypsum standard solution. By this means, assuming the solutions in both cells to be at the same temperature, automatic temperature compensation is accomplished. For example, when the conductivity of the test solution is the same for the gypsum solution, the balance point is at the electrical center of the resistance 13 and this point is marked 2.2 millimhos/cm. which is the conductivity of saturated gypsum solution at 25° C., the standard reference temperature. If the temperature of measurement happens to be 35° C., the electrical conductivity of both the test and standard solutions are about 2.6 millimhos/cm. but the bridge balances at 2.2, the conductivity value at 25° C. This method of obtaining automatic temperature compensation is made possible by the fact that the solubility of gypsum in water attains a maximum at about 40° C., and between 18° and 40° C. the solubility changes less than 4%. Between 10° and 55° C., the solubility of gypsum changes less than 8%. Also, the temperature coefficient for change of electrical conductivity of saturated gypsum solution in this range is very nearly the same as for soil solutions and irrigation waters, namely, about 2% per degree centigrade.

Although the values of the various units may be varied, the following values have been found satisfactory:

Resistance 13—200 ohm, and
Cell dimension—5⁄16 in. internal diameter and ⅞ in. long.

I claim:

1. An instrument for measuring the electrical conductivity of a test solution comprising a cell having an insulating tube open at both ends, an electrode hermetically-sealed to each end of the tube, said tube and electrodes forming a cell reservoir for containing a test solution, an inlet port extending through one electrode for introduction of the test solution into the cell reservoir, and an outlet port extending through the other electrode for discharge of the test solution, said outlet port being at a higher elevation than said inlet port and tapering upwardly to facilitate the escape of air bubbles during the filling of the cell reservoir, a second cell of similar structure as the aforedescribed first cell and in which a standard solution against which the test solution is to be measured is introduced, an upwardly-extending drainpipe open at both ends and connected between its ends with the outlet ports of both cells, through which overflow test and standard solutions will respectively flow, a suction pump connected to the upper end of said drainpipe, a hermetically-sealed flush reservoir connected to the lower end of said drainpipe for receiving the overflow test and standard solutions, and valves for alternatively shutting off the flow of the respective solutions through the cells, whereby the two cells can be independently washed, filled, and emptied of solution with the suction pump and drainpipe.

2. An instrument for measuring the electrical conductivity of a test solution comprising a cell having an insulating tube open at both ends, an electrode hermetically-sealed to each end of the tube, said tube and electrodes forming a cell reservoir for containing a test solution, an inlet port extending through one electrode for introduction of the test solution into the cell reservoir, and an outlet port extending through the other electrode for discharge of the said test solution, said outlet port being at a higher elevation than said inlet port, a second cell of similar structure as the aforedescribed first cell and in which a standard solution against which the test solution is to be measured is introduced, an upwardly-extending drainpipe open at both ends and connected between its ends with the outlet ports of both cells, through which overflow test and standard solutions will respectively flow, a suction pump connected to the upper end of said drainpipe, a hermetically-sealed flush reservoir connected to the lower end of said drainpipe for receiving the overflow test and standard solutions, and valves for alternatively shutting off the flow of the respective solutions through the cells, whereby the two cells can be independently washed, filled, and emptied of solution with the suction pump and drainpipe.

3. An instrument for measuring the electrical conductivity of a test solution comprising a hermetically-sealed cell having two electrodes and having an inlet port for introduction of the test solution and an outlet port located at a higher elevation than said inlet port for discharge of said test solution, a second cell of similar structure as the aforedescribed first cell and in which a standard solution against which the test solution is to be measured is introduced, an upwardly-extending drainpipe open at both ends and connected between its ends with the outlet ports of both cells, through which the overflow test and standard solutions will respectively flow, a suction pump connected to the upper end of said drainpipe, a hermetically-sealed flush reservoir connected to the lower end of said drainpipe for receiving the overflow test and standard solutions, and valves for alternatively shutting off the flow of the respective solutions through the cells, whereby the two cells can be independently washed, filled, and emptied of solution with the suction pump and drainpipe.

4. An instrument for measuring the electrical conductivity of a solution comprising a cell having an insulating tube open at both ends, an electrode hermetically-sealed to each end of the tube, said tube and electrodes forming a cell reservoir for containing solution, an inlet port extending through one electrode for introduction of the solution into the cell reservoir, and an outlet port extending through the other electrode for discharge of the said solution, said outlet port being at a higher elevation than said inlet port and tapering upwardly to facilitate the escape of air bubbles during the filling of the cell reservoir, an upwardly-extending drainpipe open at both ends and connected between its ends with said outlet port, through which overflow solution from said outlet port will flow, a suction pump connected to the upper end of said drainpipe, and a hermetically-sealed flush reservoir connected to the lower end of said drainpipe for receiving the overflow solution.

5. An instrument for measuring the electrical conductivity of a solution comprising a cell having an insulating tube open at both ends, an electrode hermetically-sealed to each end of the tube, said tube and electrodes forming a cell reservoir for containing solution, an inlet port extending through one electrode for introduction of the solution into the cell reservoir, and an outlet port extending through the other electrode for discharge of the said solution, said outlet port being at a higher elevation than said inlet port, an upwardly-extending drainpipe open at both ends and connected between its ends with said outlet port, through which overflow solution from said outlet port will flow, a suction pump connected to the upper end of said drainpipe, and a hermetically-sealed flush reservoir connected to the lower end of said drainpipe for receiving the overflow solution.

6. An instrument for measuring the electrical conductivity of a test solution comprising a hermetically-sealed cell having two electrodes and having an inlet port for introduction of a solution and an outlet port located at a higher elevation than said inlet port for discharge of said solution, an upwardly-extending drainpipe open at both ends and connected between its ends with said outlet port, through which overflow solution from said outlet port will flow, a suction pump connected to the upper end of said drainpipe, and a hermetically-sealed flush reservoir connected to the lower end of said drainpipe for receiving the overflow solution.

References Cited in the file of this patent
UNITED STATES PATENTS

| | | |
|---|---|---|
| 2,540,425 | Byrum | Feb. 6, 1951 |
| 2,583,276 | Patnode | Jan. 22, 1952 |